United States Patent [19]

Shibata

[11] Patent Number: 4,472,723

[45] Date of Patent: Sep. 18, 1984

[54] THERMAL HEAD

[75] Inventor: Susumu Shibata, Tokyo, Japan

[73] Assignee: Oki Electric Industry Co., Ltd., Tokyo, Japan

[21] Appl. No.: 518,767

[22] Filed: Aug. 1, 1983

Related U.S. Application Data

[63] Continuation of Ser. No. 371,209, Apr. 23, 1982.

[51] Int. Cl.³ .............................................. G01D 15/10

[52] U.S. Cl. ................................ 346/76 PH; 400/120; 219/216

[58] Field of Search ............ 346/76 PH; 219/216 PH; 400/120

[56] References Cited

U.S. PATENT DOCUMENTS 4,136,274 1/1979 Shibata et al. ................. 346/76 PH 4,232,213 11/1980 Taguchi et al. ................ 346/76 PH

FOREIGN PATENT DOCUMENTS 0144178 11/1980 Japan ............................. 346/76 PH

*Primary Examiner*—Reinhard J. Eisenzopf

*Assistant Examiner*—Todd E. DeBoer

*Attorney, Agent, or Firm*—Ratner & Prestia

[57] ABSTRACT

A thermal head for high speed printing with high temperature comprises a dielectric substrate, a first thin $S_iO_2$ layer on the substrate, heater layers on the first $S_iO_2$ layer, conductive layers for coupling the heater layer with an external circuit, a second thin $S_iO_2$ layer on the heater layer, and a protection layer on the second $S_iO_2$ layer. The width of the heater layer is less than 30 μm, and the preferable thickness of the first and second $S_iO_2$ layers is less than 2 μm. Preferably, the heater layer is made of tantalium nitride ($T_{a2}N$).

7 Claims, 9 Drawing Figures

THERMAL HEAD

This application is a continuation of application Ser. No. 371,209, filed 4-23-82.

BACKGROUND OF THE INVENTION

The present invention relates to an improvement of a thermal head for a thermal printer, in particular, relates to such a head which operates in higher temperature and high power capacity, for providing clearer and rapid printing.

With the advent of computer technology and advances in the arts of data processing, data communication and/or a facsimilie communication, requirements for increased speed of information handling have become more stringent. One known type of rapid printing is a high speed thermal printer, which has at least a thermal head and a printing paper, and operates on the principle that a thermal head, heated to a high temperature according to the pattern of a desired character to be printed, selectively changes the color of a thermal paper. A thermal printer has the advantage that it can print not only a predetermined pattern of characters, but also any pattern desired including pictures, Chinese characters, and/or Arabian characters.

A thermal printer is a kind of a dot printer which composes the pattern to be printed with a plurality of dots, and a thermal head has a plurality of heat cells arranged, for instance, in a straight line for printing these dots. As the thermal paper moves in a direction perpendicular to said straight line of heat cells, said heat cells are selectively heated, thus the color of the thermal paper is selectively changed. Thus the desired pattern is printed on the thermal paper.

We have proposed some thermal head, U.S. Pat. No. 4,136,274 (UK Pat. No. 1,524,347) is one of them.

FIG. 1 is the cross section of a prior thermal head disclosed in said U.S. patent. In FIG. 1, the reference numeral 10 is a glazed alumina substrate having a glazed layer 15 with 40–80 μm thickness, 30 is a heater layer with the thickness of 1000 Å through 2000 Å made of for instance tantalium nitride ($T_{a2}N$), 40 is a conductive layer attached to the heater layer 30 for providing the electrical coupling of the heater line with an external circuit, 50 is an $S_iO_2$ layer with the thickness of 1–3 μm for preventing the oxidation of the heater line, and 60 is a protection layer for reducing the wear of heaters due to friction with a thermal paper, and said protection layer 60 is made of for instance $T_{a2}O_5$ with the thickness of 3–10 μm.

The structure of FIG. 1 has the advantages that the fluctuation of the resistance of a heater layer is small, and the life time of a head is so long as the power applied to the head is small, however, it has the disadvantage that the power capacity of a head is small. That is to say, a prior thermal head can not have much power capacity, and therefore, can not provide a high temperature. The operation at high temperature is essential for a high speed printing. For instance, the highest power consumption of a prior thermal head is up to 1.2 watts when the width of a heater layer is 110 μm, the length of a heater layer is 215 μm, the sheet resistance of a heater layer is 17 ohms/square, that heater layer is heated with a pulse signal with the pulse width 1 msec and the period 50 msec for 30 minutes. If that prior thermal head is heated with the power higher than 1.2 watts, that heater is broken.

FIG. 2 is an explanatory drawing of a sheet resistance, in which 30 is a rectangular heater with the side length L, and 100 and 102 are conductors with the width L. In that configuration, the resistance between conductors 100 and 102 is independent from the length L, but it depends solely upon the thickness of the heater 30 and the material of the heater 30. Therefore, the sheet resistance of the heater 30 is defined by the resistance between the conductors 100 and 102, and is expressed as R ohms/square, if the resistance between the conductors 100 and 102 is R ohms.

SUMMARY OF THE INVENTION

It is an object, therefore, of the present invention to overcome the disadvantages and limitations of a prior thermal head by providing a new and improved thermal head.

It is also an object of the present invention to provide a thermal head which can operate in high temperature for high speed printing, and has a long life time.

The above and other objects are attained by a thermal head having a dielectric plane substrate, a first $S_iO_2$ layer attached on the substrate, a plurality of heater layers each having an elongated finger insulated with one another, conductive layers attached on both the extreme ends of said fingers of said heater layers for coupling each heater layer with an external circuit, a second $S_iO_2$ layer attached on said heater layers, and the width of each finger of said heater layers is less than 30 μm.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 3:
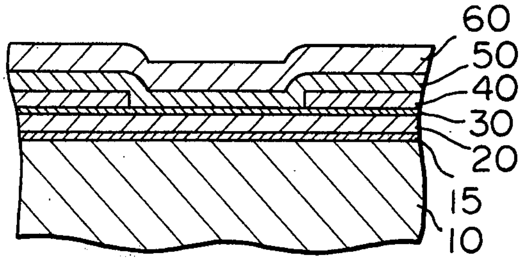
FIG. 3 shows the cross section of the thermal head according to the present invention.

FIG. 3 shows the cross section of the present thermal head, in which the reference numeral 10 is a glazed alumina substrate having a glazed layer 15 with a 40–80 μm thickness, 20 is an $S_iO_2$ layer with the thickness of 1–6 μm for improving the thermal characteristics of the head, 30 is a heater layer with the thickness of 1000 Å to 2000 Å made of, for instance, tantalium nitride ($T_{a2}N$), 40 is a conductive layer connected to the heater layer 30 for providing the electrical coupling of the heater line with an external circuit, 50 is an $S_iO_2$ layer with the thickness of 1–3 μm for preventing the oxidation of the heater line, and 60 is a protection layer for reducing the wear of heaters due to friction with a thermal paper, and said protection layer 60 is made of, for instance, $T_{a2}O_5$ with the thickness of 3–10 μm.

Figure 1:
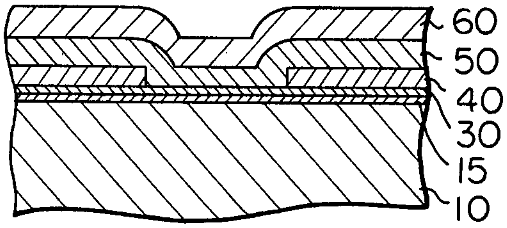
Fig. 1 PRIOR ART
FIG. 1 shows a cross sectional view of a prior thermal head.
Figure 2:
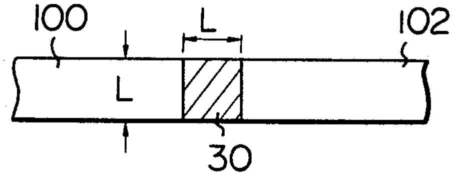
Fig. 2 PRIOR ART
FIG. 2 shows the explanatory drawing of sheet resistance.
Figure 4:
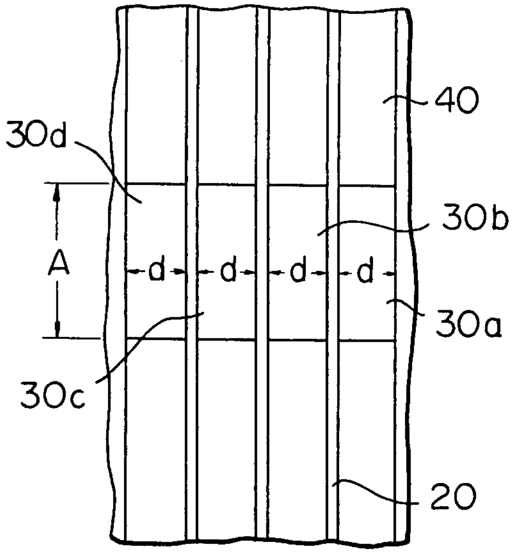
FIG. 4 is a plane view of a prior thermal head.

The feature of the structure of FIG. 4 as compared with that of FIG. 1 is the presence of a thin $S_iO_2$ layer 20 between the glazed layer 15 and the heater layer 30, so that the heater layer 30 is enclosed with a pair of $S_iO_2$ layers 20 and 50.

With the presence of the lower $S_iO_2$ layer 20 with some thickness, the heater layer 30 can take much power and provide high temperature. The effect of the presence of that lower $S_iO_2$ layer 20 depends upon the width of a heater layer as described later.

The table 1 shows the experimental result of three samples of a thermal head with the cross section of FIG. 3.

TABLE 1

| | Width of heater layer | Highest power capacity |
|---|---|---|
| Example 1 | 20 μm | 2.4 watts |
| Example 2 | 30 μm | 1.7 watts |
| Example 3 | 110 μm | 1.2 watts |

The above experiments are accomplished by applying a pulse signal with the pulse width 1 msec and the period 50 msec for 30 minutes, and that power consumption shows the power of that pulse signal in which a heater layer is broken within 30 minutes. In the above three examples, the density of a heater layer is 8 dots/mm, the sheet resistance of a heater layer is 17 ohms/square, and the thickness of $S_iO_2$ layers 20 and 50 is 2 μm.

Figure 5:
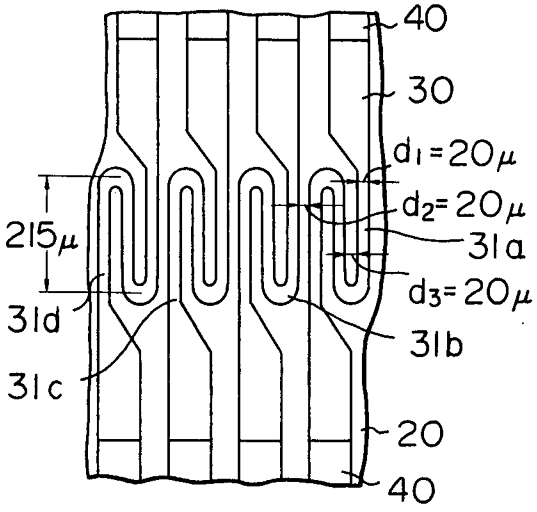
FIG. 5 is a plane view of the thermal head according to the present invention.

FIG. 5 is the plane view of a thermal head of the examples 1 and 2, in which 31*a* through 31*d* are heater layers which are in zigzag fashion or in a meander shape or tortuous configuration as shown in FIG. 5 with the width $d_1$=20 μm, the duration between each fingers of a meander patters $d_3$=20 μm, and the spacing between each heater layer $d_2$=20 μm. The example 2 of the above table is accomplished for the similar heater layer to that of FIG. 5, but the width $d_1$ is 30 μm, and the spacing and the duration $d_2$ and $d_3$ are 10 μm.

It should be appreciated in the above experimentation that the power capacity is considerably increased when the width of a heater layer is less than 30 μm, and therefore, the high temperature and/or the high speed printing operation is accomplished. In the experiment 1, when the power 2.4 watts is applied to the heater layer, a heater layer is red-heated, and that red-heated heater line is visible through the protection layer. Also, in the experiment 2, a red-heated heater layer is visible. Therefore, it should be noted in the experiments 1 and 2 that the power capacity in the experiments 1 and 2 is very large. In case of the experiment 3 in which the width of a heater layer is large, the power consumption is not increased.

FIG. 4 is the plane view of a thermal head of the example 3, in which 30*a* through 30*d* are heater layers which are straight as shown in the figure, and the width (d) of each heater is 110 μm, the duration between each heaters is 10 μm, and the length d of each heater is 215 μm. It should be noted that the power consumption in the experiment 3 is only 1.2 watt, which is considerably lower than that of other experiments. Therefore, we take the conclusion that it is preferable that the width of a heater line is less than 30 μm.

Figure 6:
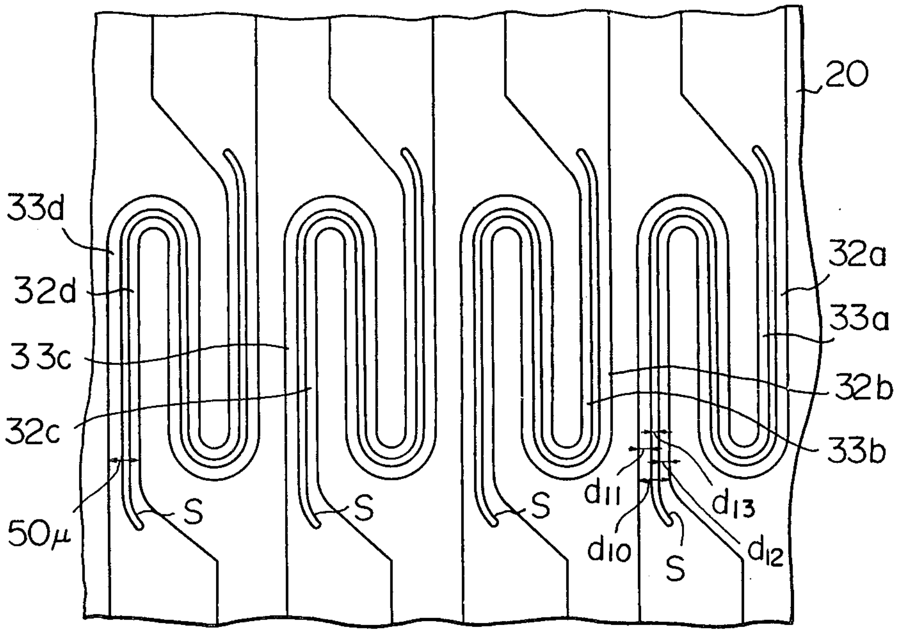
FIG. 6 is a plane view of another thermal head according to the present invention.

FIG. 6 is the plane view of another embodiment of the present thermal head, in which a heater layer is in a meander shape or a tortuous configuration which a slit S in a heater layer. When a dot density of a thermal head is not so dense, the width of a heater layer is rather wide, and it can not be less than 30 μm. In that case, a slit S is provided in a tortuous pattern. In FIG. 6, when the width $d_{10}$ is 50 μm, a slit S with the width $d_{13}$=10 μm is provided in a finger of a heater layer, and then, the rest of the finger is $d_{11}$=$d_{12}$=20 μm. Therefore, the substantial width of a finger may be less than 30 μm, and the high power capacity is obtained as shown in the table 1.

Figure 7:
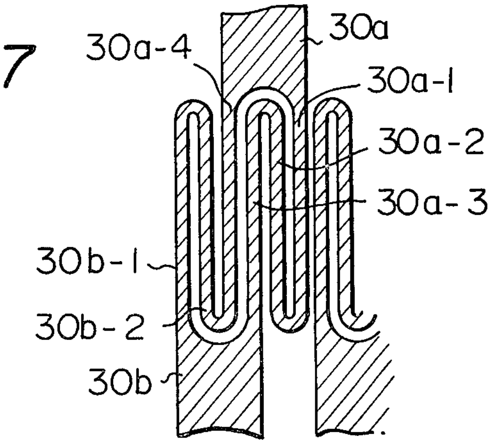
FIG. 7 is a plane view of still another thermal head according to the present invention.

FIG. 7 is another plane view of a thermal head, or a conductive layer of the thermal head according to the present invention. In FIG. 7, the conductive layer 30*a* extends two fingers 30*a*-1 and 30*a*-4, between which a pair of fingers 30*a*-2 and 30*a*-3 are positioned. The layer 30*a* is coupled with the confronting layer 30*b* through the fingers 30*a*-1, 30*a*-2 and 30*a*-3, further, the layer 30*a* is coupled with the layer 30*b* through the fingers 30*a*-4, 30*b*-1 and 30*b*-2. Thus, the width of each layer 30*a*, or 30*b* is divided to four fingers, each of which is separated by spacing. When the width of each finger is the same as the spacing, the width of each finger is only one-seventh of the width of layer 30*a* or 30*b*. Therefore, even when the width of layer 30*a* or 30*b* is wide, the width of a divided finger can be less than 30 μm for providing high temperature.

Figure 8:
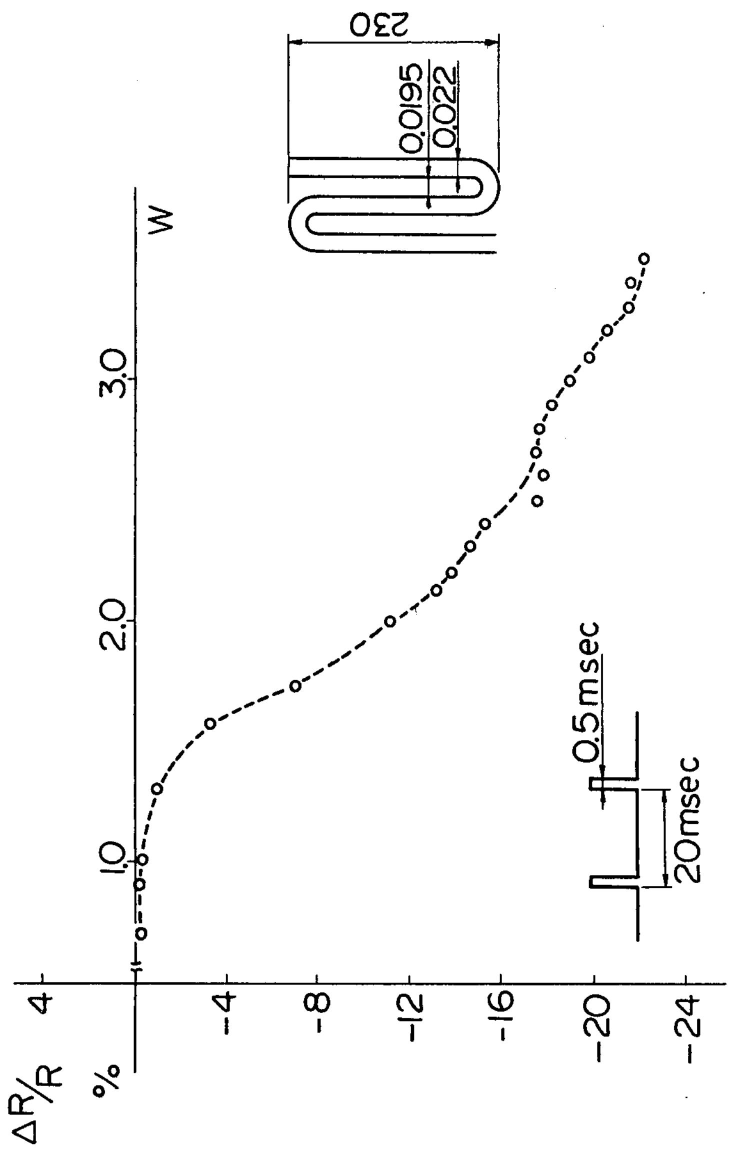
FIG. 8 shows the experimental curve which shows the effect of the structure of the present invention.
Figure 9:
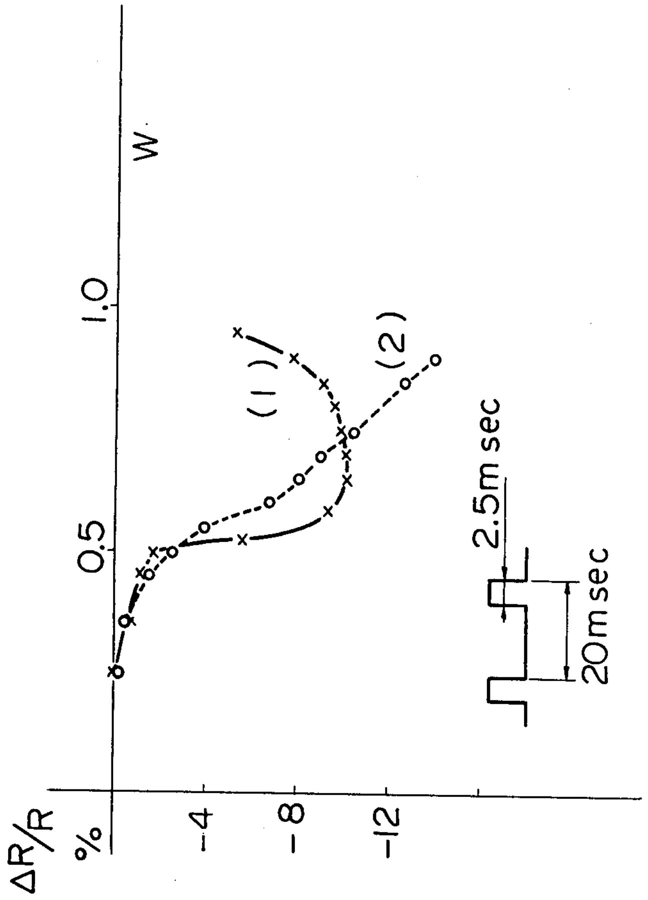
FIG. 9 shows other experimental curves.

As described above, the important features of the present thermal head are that a thin $S_iO_2$ layer is provided between a heater layer and a substrate, and that the width of a finger of a heater layer is less than 30 μm. FIGS. 8 and 9 show the experimental curves which prove the above features.

FIG. 8 shows the curves of a step stress test of a thermal head, in which a pulse signal with the period 20 msec and the pulse width 0.5 msec is applied to each finger of a heater layer through a pair of conductive layers 40, and the structure of a heater layer is such that the width of a finger is 22 μm, the spacing between each fingers is 19.5 μm, and the length of a tortuous portion of a heater is 230 μm, as shown in the figure. The horizontal axis of FIG. 8 shows the power of the pulse signal applied to each heater, and the vertical axis of FIG. 8 shows the ratio $\Delta R/R$ in which R is the initial resistance of a heater, and $\Delta R$ is the change of the resistance from said initial value. The test is accomplished for 30 minutes for each input power, and each dot in the curve shows the result after the test of 30 minutes. The curve in FIG. 8 shows the test result of a thermal head which has an $S_iO_2$ layer between a heater layer and a substrate, and the thickness of said $S_iO_2$ layer is 2 μm. It should be appreciated from the curve of FIG. 8 that the sample of the curve is not broken until the input power reaches 3.5 watts.

The similar tests are carried out by changing the pulse width of an input pulse from 0.5 msec to 2.5 msec, and the similar results are obtained. The change of the resistance (R, or $\Delta R/R$) in FIG. 8 is no matter in the present test purpose as far as the temperature of a heater, power consumption by a heater, and/or life time of a heater concern, but the facts that the input power can be high, and the life time of the sample of the curve (2) is long are important.

It should be appreciated from the curve of FIG. 8 that a sample which has an $S_iO_2$ layer can accept much power, and has long life time.

FIG. 9 shows another test result, in which the pulse period is 20 msec, the pulse width is 2.5 msec, the width of a heater layer is 110 μm, the horizontal axis shows the input power, and the vertical axis shows the ratio ΔR/R. The test is accomplished for 30 minutes for each input power. The curve (2) in FIG. 9 shows the test result that a $S_iO_2$ layer is provided between a heater layer and a substrate, and the curve (1) in FIG. 9 shows the test result that said $S_iO_2$ layer is not provided, but a heater layer is attached directly on a substrate.

It should be noted from FIG. 9 that a heater layer is broken when an input power is less than 1 watt.

According to the experimental results of FIGS. 8 and 9, we can take the conclusion that two conditions (1) a $S_iO_2$ layer is provided between a heater layer and a substrate, and (2) the width of a heater is not so wide, are necessary for applying high input power to a heater.

We have also carried out the experiment to replace that $S_iO_2$ layer between a heater layer and a substrate to $S_{i3}N_4$ layer, which has the property to prevent the diffusion of a molecule and/or an atom. However, it has been found that the life time of a thermal head with that $S_{i3}N_4$ layer is worse by 10% than a prior head without $S_iO_2$ layer.

Further, we have carried out the experiment to replace that $S_iO_2$ layer between a heater layer and a substrate to tantalum oxide, which has the property that the melting point is high (the melting point of $S_iO_2$ is 1710° C., and the melting point of tantalum oxide is 1870° C.). However, it has been found that the life time of a thermal head with tantalum oxide is worse than that with $S_iO_2$ layer.

Further, we have experimented to replace a heater layer from tantalum nitride to nickel. However, a thermal head with a nickel heater can not be red heated although an $S_iO_2$ layer is provided. Therefore, the tantalium nitride is superior to nickel as the material of a heater layer.

As described above, it has been proved through the experiments that the temperature and the life time of a thermal head are improved by providing a $S_iO_2$ layer between a heater layer and a substrate, and designing the width of a finger of a heater less than 30 μm. The material of a heater layer is tantalum nitride in view of improving the operational temperature of a thermal head.

From the foregoing it will now be apparent that a new and improved thermal head has been found. It should be understood of course that the embodiments disclosed are merely illustrative and are not intended to limit the scope of the invention. Reference should be made to the appended claims therefore rather than the specification as indicating the scope of the invention.

What is claimed is:

1. In a thermal head including a dielectric substrate, a plurality of $Ta_2N$ heater layers each having spaced apart, meandering elongated fingers, conductive layers electrically connected to opposite ends of said $Ta_2N$ heater layers for providing the electical coupling of said $Ta_2N$ heater layers with external electronic circuitry, and a protection layer, characterized in that:
   - a pair of $SiO_2$ insulating layers enclose said conductive layers and said $Ta_2N$ heater layers wherein the width of each of said $Ta_2N$ heater layers between said conducting layers is less than 30 μm.

2. A thermal head according to claim 1, wherein said heater layer is made of tantalium nitride.

3. A thermal head according to claim 1, wherein said finger of the heater layers is in a tortuous configuration.

4. The thermal head of claim 1 in which said meandering, elongated fingers are each separated by a slit to produce separated finger portions each having a width less than 30 μm.

5. The thermal head of claim 1 in which the resistivity of the heater material is 17 ohms/square.

6. The terminal head of claim 1 in which said protection layer is $Ta_2O_5$.

7. In a thermal head including a dielectric substrate, a plurality of $Ta_2N$ heater layers each having spaced apart, meandering elongated fingers, conductive layers electrically connected to opposite ends of said $Ta_2N$ heater layers for providing the electrical coupling of said $Ta_2N$ heater layers with external electronic circuitry, and a protection layer, characterized in that:
   - said meandering, elongated fingers are each separated by a slit to produce separated finger portions each having a width less than 30 μm, and
   - a pair of $SiO_2$ insulating layers enclose said $Ta_2N$ heater layers.

* * * * *